(12) United States Patent
Lee

(10) Patent No.: US 8,455,063 B2
(45) Date of Patent: Jun. 4, 2013

(54) ARTIFICIAL TURF INFILL AND ARTIFICIAL TURF INCLUDING THE SAME

(76) Inventor: Sungyull Lee, Dongnae-gu (KR)

( * ) Notice: Subject to any disclaimer, the term of this patent is extended or adjusted under 35 U.S.C. 154(b) by 803 days.

(21) Appl. No.: 12/575,011

(22) Filed: Oct. 7, 2009

(65) Prior Publication Data

US 2011/0081506 A1 Apr. 7, 2011

(51) Int. Cl.
*D06N 7/63* (2006.01)
*E01C 13/08* (2006.01)

(52) U.S. Cl.
USPC ............ 428/17; 428/86; 428/402; 264/276.1

(58) Field of Classification Search
USPC ................. 428/87, 402, 403, 407, 17
See application file for complete search history.

(56) References Cited

U.S. PATENT DOCUMENTS

| | | | |
|---|---|---|---|
| 3,995,079 A | 11/1976 | Haas, Jr. | |
| 4,044,179 A | 8/1977 | Haas, Jr. | |
| 4,337,283 A | 6/1982 | Haas, Jr. | |
| 5,041,320 A | 8/1991 | Meredith et al. | |
| 5,262,453 A * | 11/1993 | Watanabe et al. | 523/209 |
| 5,958,527 A | 9/1999 | Prevost | |
| 5,961,389 A * | 10/1999 | Dickinson | 472/92 |
| 5,976,645 A | 11/1999 | Daluise et al. | |
| 6,551,689 B1 * | 4/2003 | Prevost | 428/143 |
| 6,582,819 B2 * | 6/2003 | McDaniel et al. | 428/402 |
| 6,632,527 B1 * | 10/2003 | McDaniel et al. | 428/402 |
| 6,664,303 B1 * | 12/2003 | Michael et al. | 521/41 |
| 6,746,752 B2 * | 6/2004 | Prevost | 428/143 |
| 7,104,894 B2 * | 9/2006 | Bennett | 472/86 |
| 7,858,148 B2 * | 12/2010 | Reddick | 427/221 |
| 8,034,429 B2 * | 10/2011 | Huff et al. | 428/87 |
| 8,147,939 B2 * | 4/2012 | Horio et al. | 428/36.9 |
| 8,173,209 B2 * | 5/2012 | Chereau et al. | 427/212 |
| 2002/0048676 A1 * | 4/2002 | McDaniel et al. | 428/404 |
| 2004/0086664 A1 * | 5/2004 | Seaton | 428/17 |
| 2005/0003193 A1 * | 1/2005 | Stroppiana | 428/407 |
| 2005/0008793 A1 * | 1/2005 | Prevost | 428/17 |
| 2006/0100342 A1 * | 5/2006 | Jensen | 524/492 |
| 2008/0145574 A1 | 6/2008 | Julicher et al. | |
| 2008/0176009 A1 * | 7/2008 | Chereau et al. | 428/17 |
| 2008/0182040 A1 * | 7/2008 | Chereau et al. | 428/17 |
| 2009/0286017 A1 * | 11/2009 | Horio et al. | 428/17 |
| 2009/0286018 A1 * | 11/2009 | Horio et al. | 428/17 |
| 2011/0054080 A1 * | 3/2011 | Berlineanu et al. | 523/457 |
| 2011/0135851 A1 * | 6/2011 | Dozeman et al. | 428/17 |
| 2011/0305850 A1 * | 12/2011 | Berlineanu et al. | 428/17 |
| 2012/0183705 A1 * | 7/2012 | Chereau et al. | 428/17 |
| 2012/0258811 A1 * | 10/2012 | Tetrault et al. | 472/92 |

FOREIGN PATENT DOCUMENTS

| | | | |
|---|---|---|---|
| DE | 20317731 U1 * | 3/2004 | |
| JP | 11-61723 A | 3/1999 | |
| JP | 2003328311 A * | 11/2003 | |
| JP | 2005226234 A * | 8/2005 | |
| KR | 10-2004-0023416 A | 3/2004 | |
| KR | 10-2008-0006953 A | 1/2008 | |
| KR | 10-0834040 B1 | 5/2008 | |
| KR | 834040 B1 * | 5/2008 | |
| KR | 894033 B1 * | 4/2009 | |
| KR | 899593 B1 * | 5/2009 | |
| WO | WO 00/17452 A1 | 3/2000 | |
| WO | WO 01/98589 A2 | 12/2001 | |

* cited by examiner

*Primary Examiner* — Cheryl Juska
(74) *Attorney, Agent, or Firm* — Sherr & Jiang, PLLC

(57) ABSTRACT

An artificial turf is provided. The artificial turf includes a pile fabric having a backing, pile elements extending upwardly from the backing, and an infill layer filled on the backing such that the pile elements are at least partially embedded in the infill layer. The infill layer includes an elastic infill and a high-hardness resin infill.

9 Claims, 2 Drawing Sheets

ARTIFICIAL TURF INFILL AND ARTIFICIAL TURF INCLUDING THE SAME

BACKGROUND

1. Field

The disclosed technology relates to an artificial turf infill, and an artificial turf including the same.

2. Description of Related Art

An artificial turf was first developed in U.S.A. and has been used since 1965. The artificial turf has a structure in which fibers made of plastic filament extend upwardly from an underlying backing. The artificial turf however gradually decreased in usage due to its high hardness compared to the natural turf, and the slippery surface thereof causing a user's slippage. In the late 1990s, the artificial turf was enhanced with elasticity and low sliding resistance by erecting long fibers of soft plastic filament on the underlying backing and then filling the spaces between the long fibers with an infill such as small chip of rubber and/or sand, resulting in a prevalent use for football fields, baseball fields, etc. including playgrounds in these days.

The artificial turf infill can be used in various types: the type using only sands, the type using only rubber chips made from waste tires, the type using a two-layered structure in which sands are spread on a lower layer and rubber chips are spread on an upper layer, the type using a mixture of rubber chips and sands, the type using a mixture of rubber chips and sands coated with rubber, and so on.

SUMMARY

In one embodiment, an artificial turf includes a pile fabric having a backing and pile elements extending upwardly from the backing, and an infill layer filled on the backing such that the pile elements are at least partially embedded in the infill layer. The infill layer includes an elastic infill having a hardness ranging from 40 to 90 Shore A, and a high-hardness resin infill having a hardness ranging from 50 Shore D to 120 Rockwell R. The high-hardness resin infill includes a synthetic resin matrix and an inorganic filler dispersed in the synthetic resin matrix.

In another embodiment, a method of producing artificial turf includes providing a pile fabric having a backing, and pile elements extending upwardly from the backing, providing a high-hardness resin infill having a hardness ranging from 50 Shore D to 120 Rockwell R, the high-hardness resin infill including a synthetic resin matrix and an inorganic filler dispersed in the synthetic resin matrix, mixing the high-hardness resin infill with an elastic infill having a hardness ranging from 40 to 90 Shore A to form an infill mixture, and filling the infill mixture on the backing to form an infill layer such that the pile elements are at least partially embedded in the infill layer.

In still another embodiment, an artificial turf includes a mixture of a high-hardness resin infill and an elastic infill. The high-hardness resin infill includes a synthetic resin matrix and an inorganic filler dispersed in the synthetic resin matrix- and has a hardness ranging from 50 Shore D to 120 Rockwell R. The elastic infill has a hardness ranging from 40 to 90 Shore A. The high-hardness resin infill and the elastic infill are mixed in a weight mixing ratio ranging from 1:9 to 9:1.

DETAILED DESCRIPTION

Figure 1:
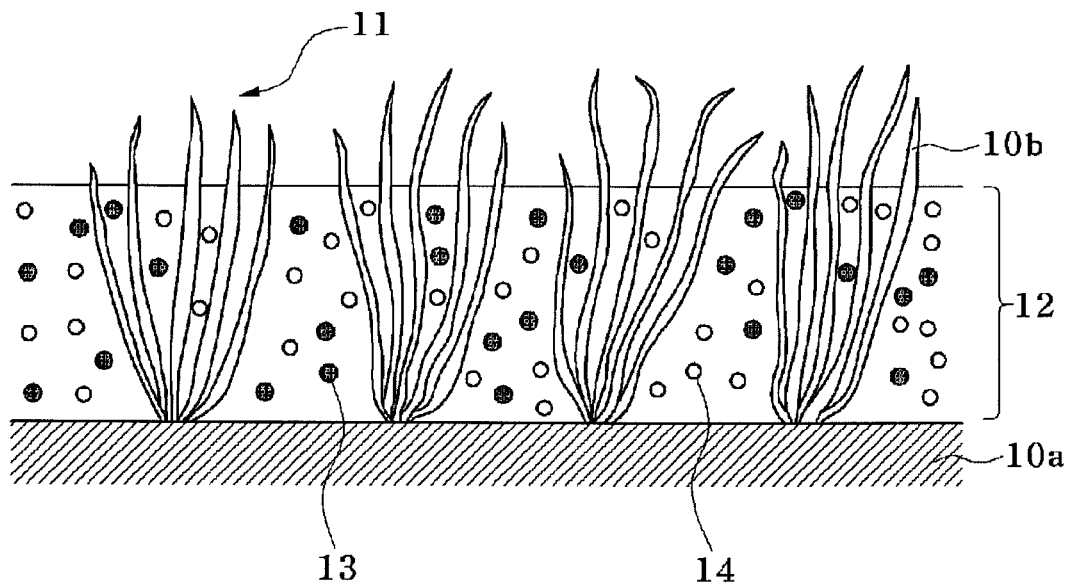
FIG. 1 is a cross-sectional view illustrating an embodiment of artificial turf filled with an artificial turf infill.

As described in the "Description of Related Art," an artificial turf infill may be used in five types, each of which has drawbacks. In the first type of the infill using only sands (U.S. Pat. No. 4,044,179), the infill may harden the entire artificial turf. Thus, when slipping down, a player may be severely injured to his/her head. Further, the slippery surface of the artificial turf may cause friction abrasion to players when impacting the turf and deterioration of the efficiency of the playground. In addition, the sands are broken into fine particles with-time, so that the fine particles are filled between other particles. As a result, the infill becomes gradually hard. In the second type using only rubber chips (U.S. Pat. No. 5,976,645), the infill has extremely high elasticity, which may cause an injury to a player's ankle, knee, waist, etc. and strain to calf muscles of the player. In the third type of the infill using a two-layered structure of rubber chips and sands (U.S. Pat. No. 4,337,283), the infill alleviates-the drawbacks of the first and second type infills. However, the sands are also broken into fine particles with the lapse of time, so that the fine particles are filled between other particles. As a result, it is difficult for the infill to avoid becoming hard. Further, it is impossible to overcome all the drawbacks of the rubber chips spread on an upper layer (i.e. the drawbacks of the second type using only rubber chips). In the fourth type of the infill using a mixture of rubber chips and sands, the infill can eliminate-all the above drawbacks. However, there is a great difference between a specific gravity of the rubber chip (from 1.15 to 1.20) and that of the sand (from 1.90 to 2.25), and thus the infill is separated up and down during use. Therefore, the infill is transformed into the third type using a two-layered structure of rubber chips and sands. Even if the rubber chips having a specific gravity similar to that of the sand are used in place of the rubber chips made from waste tires, the sands will compact and the infill will become quite hard. In the fifth type of the infill using a mixture of rubber chips and sands coated with rubber (U.S. Pat. Application 20080145574), the infill can overcome the drawback of sand compaction and hardening described in the fourth type. However, the coating of the sands costs a great deal, so that using the infill is economically disadvantageous. In addition, if an adhesive force of the coating is insufficient, the coating is worn out with time.

Among qualities of natural turf and artificial turf used for football fields, a surface hardness has a great influence on playability and risk of player injury. For this reason, the Federation Internationale de Football Association (FIFA) has established quality standards for artificial turf on the basis of surface hardness measurement (FIFA RECOMMENDED 2 STAR/1 STAR (2004. 7. 1) and IRB regulations (2004. 4)). The surface hardness measurement is to measure a peak shock of impact, Gmax, by using the test method of ASTM F355, which tests shock-absorbing properties of playing surface systems such as an artificial turf. Gmax values express a ratio of the maximum acceleration (deceleration) experienced during an impact with the surface undergoing testing, to the normal rate of acceleration due to gravity. Thus, the higher the Gmax value, the lower the shock-absorbing properties of the playing surface systems. If Gmax value is within a range between 80 and 200, the turf is usable. If Gmax value is beyond this range, the turf should be replaced. In detail, when Gmax is less than 80, the turf is too low in hardness and too high in elasticity. In contrast, when Gmax exceeds 200, the turf is too high in hardness and too low in elasticity. Particularly, in the latter case, when falling down, a player has a possibility of receiving a serious injury to his/her head.

When the infill of the artificial turf is formed of only sands, Gmax value may exceed 400. When the infill of the artificial turf is formed of only rubber chips obtained from a waste tire, Gmax value may be within a range between 40 and 70. When the infill of the artificial turf includes a thick rubber chip layer and a thin sand layer, Gmax value may be less than 80. When the infill of the artificial turf includes a thin rubber chip layer and a thick sand layer, Gmax value may exceed 200. Although-Gmax is adjusted to be within a range between 80 and 200 by adjusting thickness of the rubber chip layer and the sand layers, a thickness ratio of the layers may be slightly varied by continuous bounds of a ball and kicks of the players, a gust of wind, a heavy rain, and so on. Thus, the artificial turf may be divided into regions that partially meet the Gmax requirements and the other regions that do not meet the Gmax requirements, so that the artificial turf can be non-uniformly varied.

In the case sands are used as the infill, some of the sands are broken into fine particles with the lapse of time, so that the fine particles can fill the spaces between the other particles. Thereby, the sands are agglomerated in a hard state, and thus Gmax value may exceed 200. Further, as it is known that the sand is used as a raw material of a sand paper, the sand wears away the artificial turf, so that the sand can reduce the duration of the artificial turf. Furthermore, the sands having porous structures may absorb sweat or blood of players, molds, excrement of animals, etc., thereby containing-various microbes such as bacteria. In this manner, the sands have many factors harmful to the player's health. In addition, the sands of the artificial turf surface may cause a severe abrasion on the player's when the player-falls down or slides.

Thus, the embodiments of the inventive concept are directed to provid improved artificial turf including a new infill material.

Now, references will be made in detail to some embodiments, examples of which are illustrated in the accompanying drawings. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter. It will be readily understood that the components of the disclosure, i.e. the components generally described and illustrated in the drawings herein, could be arranged, substituted, combined, and designed in a wide variety of different configurations. Thus, all the components will be explicitly referred by those skilled in the art and form a part of the disclosure.

FIG. 1 is a cross-sectional view illustrating an embodiment of artificial turf filled with an artificial turf infill. Referring to FIG. 1, the artificial turf includes a pile fabric 11 having a backing 10a and pile elements 10b extending upwardly from the backing 10a, and an infill layer 12 filled on the backing 10a such that the pile elements 10b are at least partially embedded in the infill layer 12. Here, the infill layer 12 includes an elastic infill 13 and a high-hardness resin infill 14. Further, the high-hardness resin infill 14 may include a synthetic resin matrix and an inorganic filler dispersed in the synthetic resin matrix.

The infill layer 12 may include a mixture in which the elastic infill 13 is uniformly mixed with the high-hardness resin infill 14. For example, the infill layer 12 may include a mixture of the elastic infill 13 and the high-hardness resin infill 14 at a weight ratio ranging from 1:9 to 9:1. The weight ratio may be properly adjusted according to the physical properties required for the artificial turf.

The artificial turf may be produced as follows. First, the pile fabric 11 is provided. The pile fabric 11 has the backing 10a and the pile elements 10b extending upwardly from an upper surface of the backing 10a. Then, the high-hardness resin infill 14 including the synthetic resin matrix and the inorganic filler dispersed in the synthetic resin matrix is provided. Subsequently, the high-hardness resin infill 14 and the elastic infill 13 are mixed to form an infill mixture. Next, the infill mixture is used to form the infill layer 12 filled on the backing 10a such that the pile elements 10b are at least partially embedded in the infill layer 12. Thereby, the artificial turf can be produced. The high-hardness resin infill 14 may be prepared by mixing the synthetic resin matrix with the inorganic filler-and then extruding and pelletizing this mixture.

The backing 10a serves to fix the pile elements 10b and may have a loose texture or a perforated structure to drain well. The backing 10a may be in contact with the ground (not shown).

The pile elements 10b are attached to the backing 10a to serve as the surface of the artificial turf. Each of the pile elements 10b may be made of plastic filament such as polyethylene, polypropylene, polyvinylidene chloride, nylon, or the like and may contain a green pigment to give the feel similar to the natural turf.

The infill layer 12 may be formed by filling an empty space between-the pile elements 10b with the infill in order to give the artificial turf with elasticity and low sliding resistance. Because the infill layer 12 has a great influence on performance of the artificial turf, the infill layer 12 is required to have proper and consistent elasticity, hardness, and drain performance. The mixture of the elastic infill 13 and the high-hardness resin infill 14 is used as the infill layer 12 so that all the characteristics required for the artificial turf infill can be exerted.

The elastic infill 13 may be comprised of recycled chips of a waste tire, thermoplastic elastomer (TPE) chips, special rubber chips or combinations thereof in order to give elasticity to the artificial turf. The recycled chips of waste tires may be obtained by pulverizing the waste tires. The special rubber chips may be obtained by measuring rubber such as ethylene propylene diene monomer (EPDM) rubber, isobutylene isoprene rubber (called butyl rubber), Hypalon rubber, or neoprene rubber along with compounding chemicals such as a vulcanizing agent, a vulcanizing accelerator, a vulcanization active agent, an inorganic filler, a softener, a processing aid, an anti-aging agent, and the like, mixing the measured materials, vulcanizing the mixture into a planar rubber, and pelletizing the planar rubber using a mill. Further, the TPE chips may be obtained by mixing TPE, such as styrene butadiene styrene block copolymer (SBS), styrene isoprene styrene block copolymer (SIS), styrene ethylene butadiene styrene copolymer (SEBS), thermoplastic polyolefin (TPO), thermoplastic polyurethane (TPU) or the like, with an inorganic filler, a softener, etc. using an extruder and then pelletizing the mixture. The elastic infill 13 may have a diameter ranging from 0.3 mm to 3.0 mm, and preferably from 0.5 mm to 2.0 mm. The elastic infill 13 may have a Shore A hardness ranging from 40 to 90, preferably from 50 to 80, and more preferably from 55 to 75, without placing restrictions on the other physical properties. If the hardness of the elastic infill 13 is less than 40 Shore A, the elastic infill 13 gets too high elasticity, so that the players have a probability of receiving injuries to their ankles, knees, and waists. If the hardness of the elastic infill 13 exceeds 90 Shore A, Gmax value may exceed 200 when the elastic infill is mixed with the high-hardness resin infill, so that the players can receive a lethal injury to their heads when falling down. An amount of the mixed inorganic filler may be properly adjusted such that the elastic infill 13 has proper hardness and specific gravity.

The high-hardness resin infill 14 included in the infill layer 12 along with the elastic infill 13 may be a composite of a synthetic resin and an inorganic filler.

Figure 2:
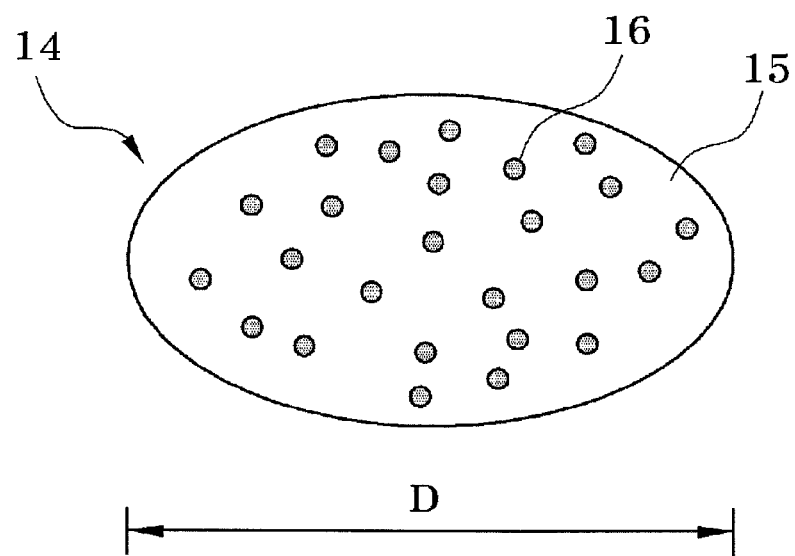
FIG. 2 illustrates an embodiment of a high-hardness resin infill used for an artificial turf infill.

FIG. 2 illustrates an embodiment of a high-hardness resin infill used in an artificial turf infill. As illustrated in FIG. 2, the high-hardness resin infill 14 may include a synthetic resin matrix 15 and an inorganic filler 16 dispersed in the synthetic resin matrix 15. The high-hardness resin infill 14 has at least higher hardness than the elastic infill 13 of FIG. 1, so that the high-hardness resin infill 14 can give a hard property to the artificial turf.

The high-hardness resin infill 14 may have a hardness ranging from 50 Shore D to 120 Rockwell R, and preferably from 60 Shore D to 110 Rockwell R. If the hardness of the high-hardness resin infill 14 is less than 50 Shore D, the high-hardness resin infill 14 gets high elasticity due to synergism with the elastic infill 13, so that the players have a probability of receiving injuries to their ankles, knees, and waists. In summer, the temperature of an artificial turf playground may increase up to 70° C. or more. In this case, the plastic chips are conglomerated or stuck to the spikes of the player's shoes to interfere with his/her play. Further, the duration of the artificial turf infill may be reduced. If the hardness of the high-hardness resin infill 14 exceeds 120 Rockwell R, the plastic is too hard, so that the players can be injured to their heads when falling down although the high-hardness resin infill 14 is mixed with the elastic infill 13. Further, the high-hardness resin infill 14 may cause the artificial turf to be rapidly worn out, thereby reducing the duration of the artificial turf.

A material used as the synthetic resin matrix 15 is not particularly limited so long as the high-hardness resin infill 14 is selected to cover the above hardness range. As an example, when the artificial turf is used in the playground, a good weatherable polymer material may be used as the synthetic resin matrix 15 considering that the artificial turf must be exposed to the external environment for a long time. For example, the polymer material used as the synthetic resin matrix 15 may include polyethylene, polypropylene, and ethylene copolymer, which may be used alone or in combination of at least two thereof. The ethylene copolymer may have a monomer unit based on ethylene and another monomer unit based on α-olefin having 3 to 20 carbon atoms. The α-olefin may include propylene, 1-butene, 4-methyl-1-pentene, 1-hexene, 1-octene, 1-decene, or the like. As another example, the ethylene copolymer may have a monomer unit based on ethylene and a monomer unit based on vinyl acetate or acrylate. More specifically, the ethylene copolymer may include ethylene-1-butene copolymer, ethylene-4-methyl-1-pentene copolymer, ethylene-1-hexene copolymer, ethylene-1-octene copolymer, ethylene-1-decene copolymer, ethylene-1-butene-4-methyl-1-pentene copolymer, ethylene-1-butene-1-hexene copolymer, ethylene-1-butene-1-octene copolymer, ethylene-ethylacrylate, ethylene-butylacrylate, ethylene-methacrylate, ethylene-methylmethacrylate, or the like. The ethylene copolymer may contain the ethylene-based monomer unit of 50 wt % or more when a content of the whole monomer units thereof is defined as 100 wt %.

When the inorganic filler 16 is dispersed in the synthetic resin matrix 15, the hardness and specific gravity of the high-hardness resin infill 14 may be enhanced. The inorganic filler 16 may include talc, mica, calcium carbonate ($CaCO_3$), silica ($SiO_2$), wollastonite ($CaSiO_3$), clay, diatomite, titanium dioxide ($TiO_2$), zeolite, and the like, which may be used alone or in combination of at least two thereof, and preferably calcium carbonate in cost consideration. The inorganic filler 16 may be in powder form, an average diameter of which may range from 0.1 μm to 5 μm.

The inorganic filler 16 may have a content ranging from 20 wt % to 80 wt %, preferably from 30 wt % to 75 wt %, and more preferably from 40 wt % to 70 wt %, with respect to a total weight of the high-hardness resin infill 14. When the content of the inorganic filler 16 is within the above range, it is possible to obtain the high-hardness resin infill 14 having appropriate hardness and specific gravity.

Further, a specific gravity difference between the elastic infill 13 and the high-hardness resin infill 14 may be 30% or less, preferably 25% or less, and more preferably 20% or less on the basis of a lower one when the specific gravity of the elastic infill 13 is compared with that of the high-hardness resin infill 14. If the specific gravity difference exceeds this value, the chips may be separated into upper and lower parts.

The high-hardness resin infill 14 may be produced to have desired hardness and specific gravity by properly adjusting kinds and contents of the synthetic resin matrix 15 and the inorganic filler 16.

The high-hardness resin infill 14 may contain additives typically used in the art, for instance an antioxidant, a light stabilizer, a heat stabilizer, and a colorant. The high-hardness resin infill 14 may be produced by mixing a synthetic resin and an inorganic filler with the additives using a mixer. For example, the synthetic resin, the inorganic filler, and the additives may be mixed and extruded using a Banbury kneader, a Buss kneader, a single screw extruder or a twin screw extruder.

As illustrated in FIG. 2, the high-hardness resin infill 14 may have the shape of an elliptical pellet. The pellet may have a diameter (D) ranging from 0.5 mm to 2.5 mm. The high-hardness resin infill 14 may have the shape of a rod, a sphere, or an ellipsoid. The pellet may have a polygonal cross section such as a tetragonal or hexagonal cross section, as well as the circular cross section.

The suitable artificial turf infill is not limited to a mixture of the elastic infill 13 and the high-hardness resin infill 14, each of which is a single kind. Thus, the suitable infill may include a mixture of the elastic infill 13 and the high-hardness resin infill 14, each of which is at least two kinds having different colors and shapes. A mixing ratio of the elastic infill 13 to the high-hardness resin infill 14 may be variously selected according to uses. In general, the mixing ratio may range from 9:1 to 1:9, preferably from 8:2 to 2:8, more preferably from 7:3 to 3:7, and most preferably from 6:4 to 4:6. If the mixing ratio exceeds 9:1, Gmax value may be less than 80, so that the players have a high probability of receiving injuries to their ankles, knees, and waists. In contrast, if the mixing ratio is less than 1:9, Gmax value may exceed 200 so that the players can have a g high probability of receiving a lethal injury to their heads when falling down while playing a game. Here, Gmax value means a measured value in a shock test and can be measured on the basis of ASTM F355-A.

Figure 3A:
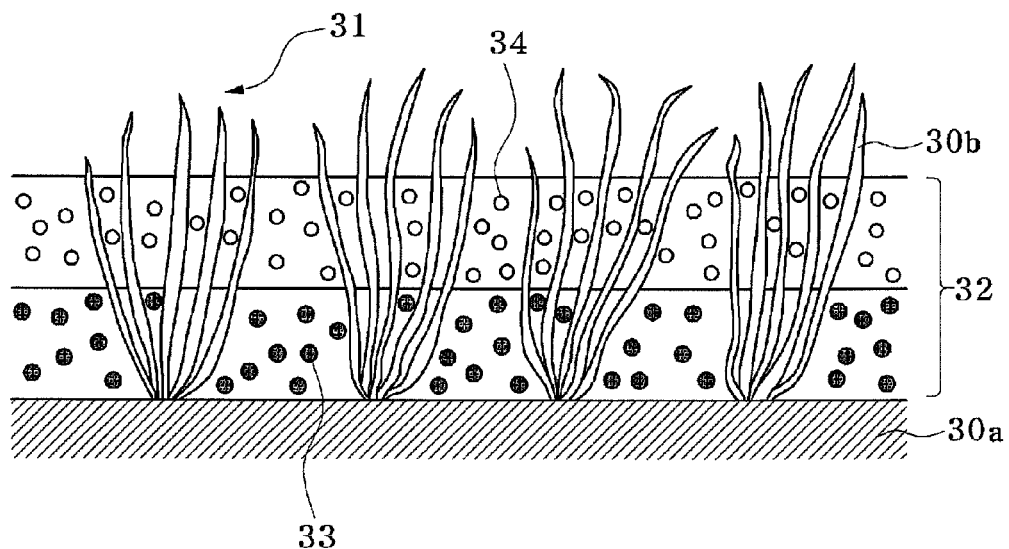
FIGS. 3A and 3B are cross-sectional views illustrating other embodiments of artificial turf filled with an artificial turf infill.
Figure 3B:
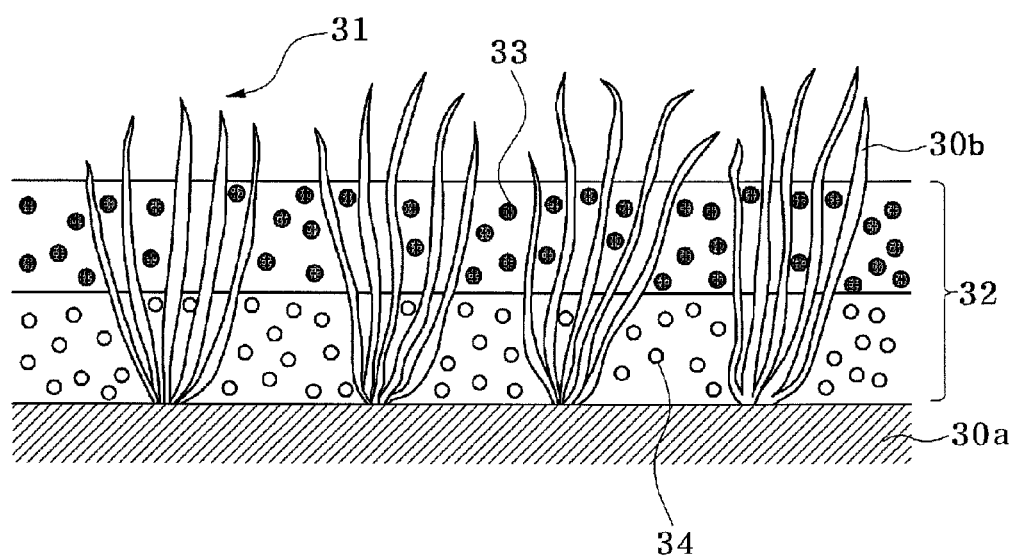

FIGS. 3A and 3B are cross-sectional views illustrating other embodiments of artificial turf having an artificial turf infill. FIG. 3A shows an artificial turf in which a pile fabric 31 having a backing 30a and pile elements 30b is filled with an infill layer 32. Here, the infill layer 32 is divided into a lower layer having an elastic infill 33 and an upper layer having a high-hardness resin infill 34. Unlike FIG. 3A, FIG. 3B shows an artificial turf in which the infill layer 32 is divided into a lower layer having high-hardness resin infill 34 and an upper layer having the elastic infill 33. In consideration of shock absorbency and efficiency of the playing field, the infill layer 32 may be used in such a manner that the layers having the elastic infill 33 and the high-hardness resin infill 34 are respectively stacked as the upper and lower layers thereof, or vice versa. Further, the upper and lower layers may each have various thicknesses according to the usage.

In detail, the artificial turf infill may be used in a two-layered structure in which the upper and lower layers are separated from each other according to the kind and use of the artificial turf as described above, or in a multi-layered structure, instead of being used in a one-layered structure in which the elastic infill and the high-hardness resin infill are mixed.

According to the foregoing, the artificial turf infill disclosed herein uses a new infill in place of sands used as a conventional infill, so that it is possible to overcome the problem of hardening the artificial turf due to sand compaction and the problem of being contaminated by various bacteria or germs due to a porous sand structure. The kind and the mixing ratio of the elastic infill and the high-hardness resin infill are properly selected to reduce a specific gravity difference, so that a variety of physical properties can be stably maintained in continuous use. The artificial turf having the abovementioned artificial turf infill has elasticity, hardness, and sliding resistance without partiality, so that it is possible to prevent the players from being injured and improve playability.

Hereinafter, the technology disclosed herein will be described in more detail with reference to some examples.

EXAMPLES

Preparation of samples: As shown in Table 1, infill chips were made in various mixing ratios and were subjected to measurement of hardness and specific gravity.

TABLE 1

Hardness and Specific Gravity of Elastic Infill and High-hardness Resin Infill

| | Elastic Infill | | | | | High-hardness Resin Infill | | | |
|---|---|---|---|---|---|---|---|---|---|
| | TR-1 | EP-1 | EP-2 | EP-3 | TP-1 | PE-1 | PE-2 | PE-3 | PP-1 |
| Tire | 100 | | | | | | | | |
| EPDM | | 100 | 100 | 100 | | | | | |
| SEBS | | | | | 100 | | | | |
| HDPE | | | | | | 100 | 100 | 100 | |
| PP | | | | | | | | | 100 |
| Sulfur | | 2.00 | 2.00 | 2.00 | | | | | |
| M | | 1.50 | 1.50 | 1.50 | | | | | |
| TS | | 0.50 | 0.50 | 0.50 | | | | | |
| Stearic Acid | | 1.00 | 1.00 | 1.00 | | | | | |
| Zinc Oxide | | 5.00 | 5.00 | 5.00 | | | | | |
| Calcium Carbonate | | 50 | 250 | 500 | 200 | 50 | 200 | 400 | 300 |
| Paraffin Oil | | 20 | 20 | 20 | 20 | | | | |
| Chip Production Mode | Pulverization | Pulverization | Pulverization | Pulverization | Pelletization | Pelletization | Pelletization | Pelletization | Pelletization |
| Hardness (Shore A) | 65 | 40 | 75 | 90 | 75 | | | | |
| Hardness (Shore D) | | | | | | 65 | 66 | 67 | |
| Hardness (Rockwell R) | | | | | | | | | 110 |
| Specific Gravity | 1.15 | 1.13 | 1.60 | 1.90 | 1.55 | 1.20 | 1.65 | 1.94 | 1.74 |

Content: weight part
SEBS: Styrene Ethylene Butadiene Styrene Block Copolymer
HDPE: High Density Polyethylene
PP: Polypropylene Homopolymer
M: Mercaptobenzothiazole
TS: Tetramethylthiuram Monosulfide The following tests were performed on mixtures produced by mixing at various ratios the infill chips made in the above mixing ratios, and the results were provided in Table 2.

1. Shock Test: The mixture as an infill was spread on a pile fabric at a thickness of 35 mm, thereby making an artificial turf. Then, Gmax value of the surface of the artificial turf was measured by the shock test, ASTM F3550-A.

2. Distribution Test: A soccerball was bounced 1000 times at a height of 50 cm within the artificial turf having an area of 30 cm×30 cm, and then a distribution status of the infill chips was examined at the center of the artificial turf.

TABLE 2

Shock and Distribution Test Results According to Mixture of Various Elastic Infills and High-hardness Resin Infills

| Mixing Ratio | Gmax | Specific Gravity Difference (%) | Distribution Status |
|---|---|---|---|
| TR-1:PE-1 = 10:1 | 75 | 4 | Uniform Distribution |
| TR-1:PE-1 = 1:10 | 220 | 4 | " |
| TR-1:PE-1 = 4:6 | 110 | 4 | " |
| TR-1:PE-2 = 4:6 | 120 | 35 | Separation between TR-1 above and PE-2 below |
| EP-1:PE-2 = 8:2 | 70 | 46 | Separation between EP-1 above and PE-2 below |
| EP-2:PE-1 = 6:4 | 100 | 33 | Separation between EP-2 below PE-1 above |

TABLE 2-continued

Shock and Distribution Test Results According to Mixture of Various Elastic Infills and High-hardness Resin Infills

| Mixing Ratio | Gmax | Specific Gravity Difference (%) | Distribution Status |
|---|---|---|---|
| EP-2:PE-2 = 5:5 | 110 | 3 | Uniform Distribution |
| EP-3:PE-1 = 9:1 | 250 | 58 | Separation between EP-3 below and PE-1 above |
| EP-3:PE-3 = 6:4 | 300 | 2 | Uniform Distribution |
| EP-2:PP-1 = 8:2 | 180 | 9 | " |
| TP-1:PE-2 = 4:6 | 120 | 6 | " |
| TP-1:PP-1 = 1:10 | 300 | 12 | " |

Accepted Range of Gmax value: 80 through 200

It can be seen from the results of Table 1 that, as the content of the inorganic filler increases, the hardness and specific gravity of the elastic infill and the high-hardness resin infill are also increased. It can be seen from the results of the distribution test of Table 2 that, in the case of the artificial turf infill in which the elastic infill is mixed with the high-hardness resin infill, the distribution status is not maintained when the specific gravity difference between the elastic infill and the high-hardness resin infill exceeds about 30% with respect to the smallest specific gravity. When the elastic infill (EP-3) having an excessive content of filler and the high-hardness resin infills (PE-3 and PP-1) are used, the hardness greatly increases-so that the value of Gmax may deviate from the accepted range depending on the mixing ratio, but it can be seen from the results of the shock test that the kind and the mixing ratio of the elastic infill and the high-hardness resin infill are properly selected so that the desired physical properties can be adjusted to be suitable for uses.

From the foregoing, it will be appreciated that various embodiments of the present disclosure have been described herein for purposes of illustration, and various modifications may be made in the scope and spirit of the present disclosure. Accordingly, the various embodiments disclosed herein are not intended to limit the true scope and spirit being indicated by the following claims.

What is claimed is:

1. An artificial turf, comprising:
   a pile fabric having a backing, and pile elements extending upwardly from the backing; and
   an infill layer disposed on the backing such that the pile elements are at least partially embedded in the infill layer, wherein the infill layer includes an elastic infill having a hardness ranging from 40 to 90 Shore A, and a high-hardness resin infill having a hardness ranging from 50 Shore D to 120 Rockwell R, the high-hardness resin infill including a synthetic resin matrix and an inorganic filler dispersed in the synthetic resin matrix, and wherein the high-hardness resin substantially substitutes sands used as a conventional infill.

2. The artificial turf according to claim 1, wherein the synthetic resin matrix includes at least one selected from the group consisting of polyethylene, polypropylene, and ethylene copolymer.

3. The artificial turf according to claim 1, wherein the inorganic filler has a content ranging from about 20 wt % to about 80 wt % with respect to a weight of the high-hardness resin infill.

4. The artificial turf according to claim 1, wherein the infill layer includes a mixture of the elastic infill and the high-hardness resin infill.

5. The artificial turf according to claim 4, wherein the mixture of the elastic infill and the high-hardness resin infill has a weight mixing ratio ranging from about 1:9 to about 9:1.

6. The artificial turf according to claim 1, wherein the infill layer includes at least two stacked sub-layers, including a sub-layer having the elastic infill and a sub-layer having the high-hardness resin infill.

7. The artificial turf according to claim 1, wherein the elastic infill and the high-hardness resin infill are configured to have a specific gravity difference therebetween less than 30% with respect to a lower one of specific gravities thereof.

8. A method of producing artificial turf, comprising:
   providing a pile fabric having a backing, and pile elements extending upwardly from the backing;
   providing a high-hardness resin infill having a hardness ranging from 50 Shore D to 120 Rockwell R, the high-hardness resin infill including a synthetic resin matrix and an inorganic filler dispersed in the synthetic resin matrix;
   mixing the high-hardness resin infill with an elastic infill having a hardness ranging from 40 to 90 Shore A to form an infill mixture; and
   filling the infill mixture on the backing to form an infill layer such that the pile elements are at least partially embedded in the infill layer.

9. The method according to claim 8, wherein the providing the high-hardness resin infill is performed by mixing, extruding, and pelletizing the synthetic resin matrix and the inorganic filler.

* * * * *